United States Patent [19]

Imoto

[11] Patent Number: 4,801,190

[45] Date of Patent: Jan. 31, 1989

[54] TWO-WAY OPTICAL FIBER TRANSMISSION NETWORK

[75] Inventor: Katsuyuki Imoto, Sayama, Japan

[73] Assignee: Hitachi, Ltd., Tokyo, Japan

[21] Appl. No.: 58,197

[22] Filed: Jun. 4, 1987

[30] Foreign Application Priority Data

Jun. 10, 1986 [JP] Japan .................................. 61-132815

[51] Int. Cl.⁴ .............................................. G02B 6/28
[52] U.S. Cl. ................................. 350/96.16; 455/607; 455/612
[58] Field of Search .......................... 350/96.15, 96.16; 455/607, 610, 612

[56] References Cited

U.S. PATENT DOCUMENTS

| 4,511,208 | 4/1985 | Ozeki et al. | 350/96.16 |
| 4,568,931 | 2/1986 | Biolley et al. | 455/607 X |
| 4,690,491 | 9/1987 | Stein et al. | 350/96.16 |
| 4,705,350 | 11/1987 | Cheng | 350/96.16 |

Primary Examiner—John D. Lee
Attorney, Agent, or Firm—Antonelli, Terry & Wands

[57] ABSTRACT

A two-way optical fiber transmission network comprises: a center that transmits and receives information; a plurality of areas each containing a plurality of subscribers using information from the center; an optical start coupler connected at least with the plurality of subscribers in the area which is in the shortest distance to the center; an optical fiber cable connecting the optical star coupler with the center; and optical fiber cables connecting the plurality of subscribers in the remaining areas with the center.

10 Claims, 6 Drawing Sheets

TWO-WAY OPTICAL FIBER TRANSMISSION NETWORK

BACKGROUND OF THE INVENTION

The present invention relates to a two-way optical fiber transmission network for efficient transmission of information between subscribers scattered around a center.

Active research efforts are now being made in the industry to develop a method of two-way optical fiber transmission between subscribers which introduces optical fibers into subscribers' line to achieve high-speed, broadband transmission of information including video-service. The outline of such transmission system is given, for instance, in a paper titled "Fiber Optic Subscriber Communication System-Overview", Kenkyu Jitsuyoka Houkoku (E.C.L. Tech. Jour.), NTT, Japan, Vol. 34, No. 7, pp. 1049–1056, written by S. Shimada. FIG. 6 is a functional block diagram showing one example of conventional communication system. This communication system connects the center 1a and a subscriber 2a through one optical fiber cable 3 through which video information, telephone data and high-speed data are transmitted in both directions by using light signals with two different wavelengths ($\lambda 1, \lambda 2$).

To describe in more detail, in the center 1a, information signals from video selecting equipment, broadband switching system and digital local switching system are converted into light signals with wavelength $\lambda 1$ by optical transmitter 5-1 from which they are transferred to optical multi/demultiplexer 4-1 and further transmitted over optical fiber cable 3 to the subscriber 2a. Having reached the subscriber 2a, the light signals with wavelength $\lambda 1$ are demultiplexed and fed to optical receiver 6-1 where they are converted into electric signals which are then supplied to television sets 7-1, 7-1, telephone 7-3 and facsimile 7-4.

Conversely, information from the subscriber 2a such as from television 7-5, telephone 7-6 and facsimile 7-7 is transferred to optical transmitter 5-2 from which it is converted into light signals with wavelength $\lambda 2$. The converted light signals are further transferred to optical multi/demultiplexer 4-2 and transmitted over optical fiber cable 3 to the center 1a where they are demultiplexed by optical multi/demultiplexer 4-1, fed to optical receiver which converts the received optical signals into electric signals that are then supplied to the switching system.

The subscribers, as shown in FIG. 7, are widely distributed around the center 1 as represented by areas A1 through A4. The distances from the center to the areas 11–14 greatly vary from several hundred meters at minimum in the case of area A4 to 10 kilometers at maximum for area A1. The subscriber's population also varies from area to area; some area has a large subscriber population and some area has a very small number of subscribers.

Such regional differences in the distance from the center, however, result in differences in the optical fiber cable loss, as shown in FIG. 8. That is, received signal power varies from one subscriber to another. In the case of a single mode optical fiber using a wavelength of 1.3 $\mu$m of FIG. 8, for example, there is a received signal power difference of approximately 18 dB between subscribers located 10 kilometers and 200 meters from the center (see FIG. 9). This requires installing in the receivers of the center and subscribers an AGC (automatic gain control) circuit that produces a dynamic range of more than 20 dB or a variable optical attenuator. This disadvantage not only increases the system's cost but lowers the transmission efficiency.

SUMMARY OF THE INVENTION

The objective of this invention is to provide a two-way optical fiber transmission network which achieves a substantial reduction in cost through efficient use of transmission lines.

The above objective is accomplished by making an effective use of optical transmission link margin obtained as a result of reduction in the transmission distance, as illustrated in FIG. 9. In other words, for the area where a large optical transmission link margin can be obtained, one optical fiber cable is laid to that area at which the optical fiber cable is branched to Np subscribers by a one-to-Np type optical star coupler with one input and Np output ports. The optical star coupler may, for instance, be made in accordance with U.S. Pat. No. 4,726,643 granted Feb. 3, 1988.

The method of sending information signals from the center to subscribers and vice versa is the one in which the signals are transmitted to the receiving side through a wavelength transducer which can change the wavelength to any desired value, with the receiving side selectively receiving the signals of desired wavelength by means of a wavelength selecting switch.

The principle of the two-way optical fiber transmission network according to this invention is shown in FIG. 1. In the area A1 with its distance 11 close to 10 km, an optical fiber cable is laid from the center 10 individually to respective subscribers 20. As the distance 12, 13, 14 becomes shorter than the maximum optical fiber transmission distance of say 10 km, as with the areas A2, A3 and A4, the number of branches Np in the optical star coupler 30 increases. The maximum transmission distance of the optical fiber depends on the characteristics of light emitting and light receiving elements and is also affected by the density of subscriber population. The maximum allowable number of branches Np depends on a dividing loss and excess loss of the optical star coupler 30 and is given by the following expression.

$$\text{Optical transmission link margin} = \text{dividing loss} + \text{excess loss} \qquad (1)$$

FIG. 4 shows the relation among the dividing number N, the dividing loss and the (dividing loss + excess loss) of the optical star coupler. (This is taken from "Optical Fiber Coupler and Fabrication Method," in Proc. IECE Tech. Meet. on Opt. and Quantum Electron (Japan), Vol. OQE84-107, pp. 81–87, Jan. 1985, written by K. Imoto, et al.) FIG. 5 shows the maximum allowable dividing number Np with respect to a transmission distance l that is determined from FIGS. 4 and 9. In FIG. 5, when l is 2 km, Np will be 20. In laying optical fiber cables to 20 cases of subscribers in the area with l=2 km, the conventional method requires a total cable length of 40 km, while this invention needs only about 2 km. In other words, the optical fiber transmission network of this invention costs approximately 1/20 as much as the conventional method does. When a cable cost is compared assuming the optical fiber at 200 yen per meter, the conventional method costs 8 million yen for 20 cases whereas the cable cost of this invention is only 400,000 yen for 20 cases. This is only a simplified example, and considering the fact that the actual optical fiber cable laying and connecting cost greatly varies depending on the length and number of the optical fibers, it is possible with this invention to achieve a low-cost system as low as less than 1/100 of the cost of the conventional method when compared in terms of overall cost.

As to the method of information signal transmission, a wavelength transducer is used on the sending side to change the wavelength to a desired value before transmitting the signal and a wavelength selecting switch is used on the receiving side to selectively receive signals of a desired wavelength, thereby preventing signal interference between subscribers. Another method of preventing interference is to use optical signals of the same wavelength in one-way video distribution services from the center to subscribers as in CATV (common antenna television or cable television) and to convert the signals into an arbitrary wavelength for selective reception only in bidirectional line switching services between center and subscribers as in television phone. It is also possible to assign a unique wavelength to each subscriber for two-way communication.

DESCRIPTION OF THE PREFERRED EMBODIMENTS

Figure 1:
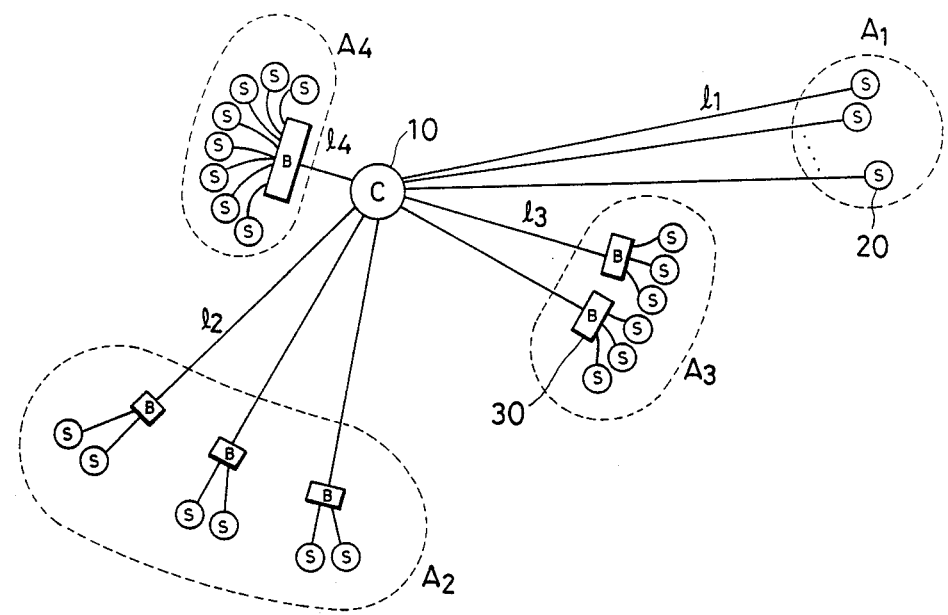
FIG. 1 is a network configuration diagram showing one example of the two-way optical fiber transmission network according to this invention.
Figure 2:
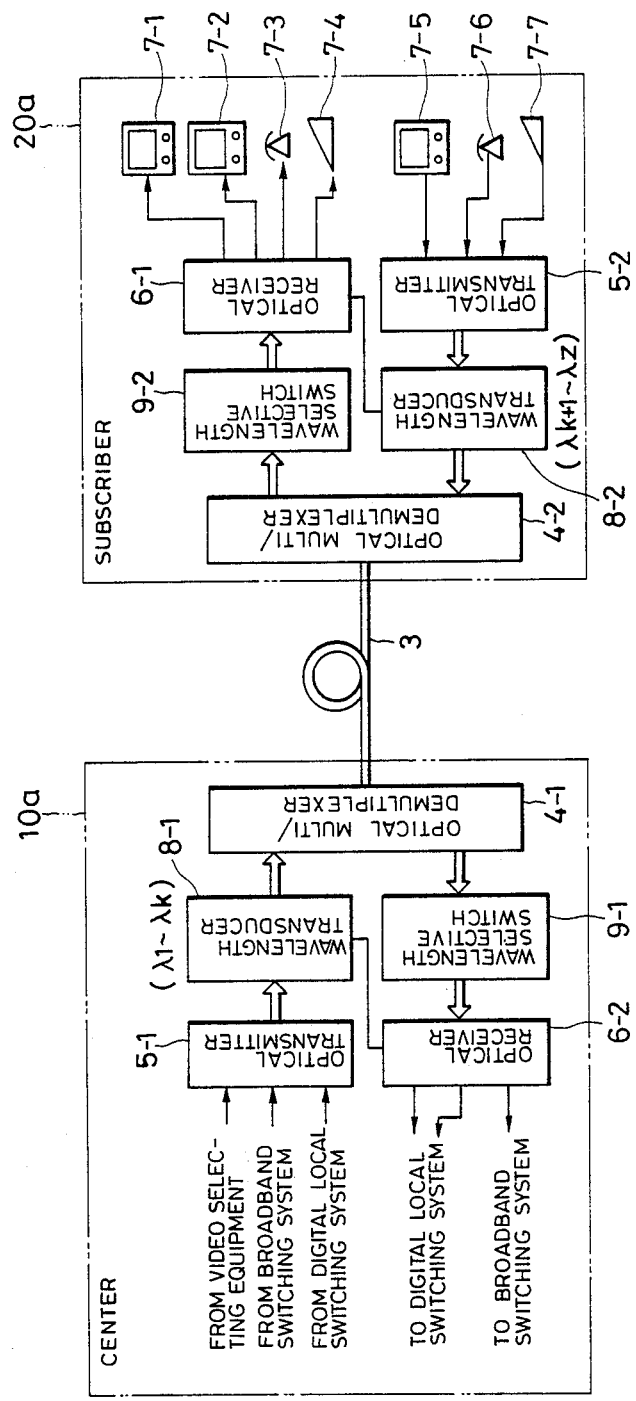
FIG. 2 is a functional block diagram of the system at the center and subscriber used in the above embodiment.
Figure 4:
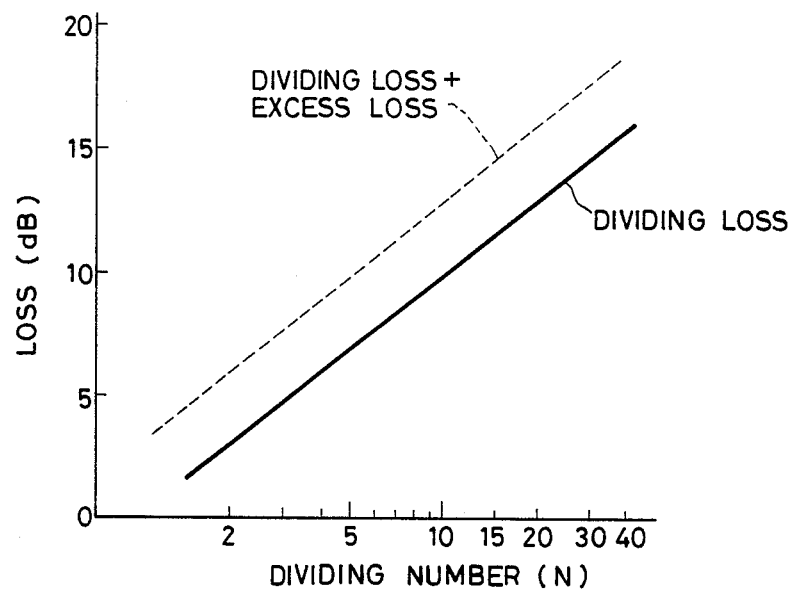
FIG. 4 is a graph showing the relation between the dividing number N and the loss of the optical star coupler used in the above embodiments.
Figure 5:
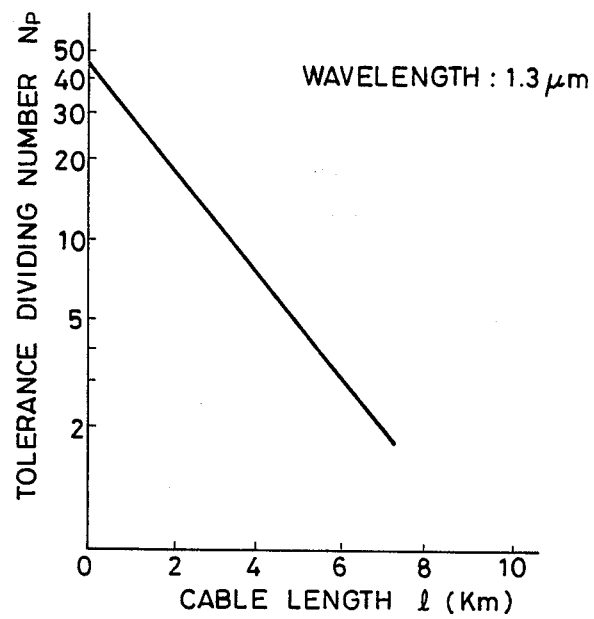
FIG. 5 is a graph showing the maximum allowable number of branches in the optical star coupler with respect to the transmission distance.
Figure 6:
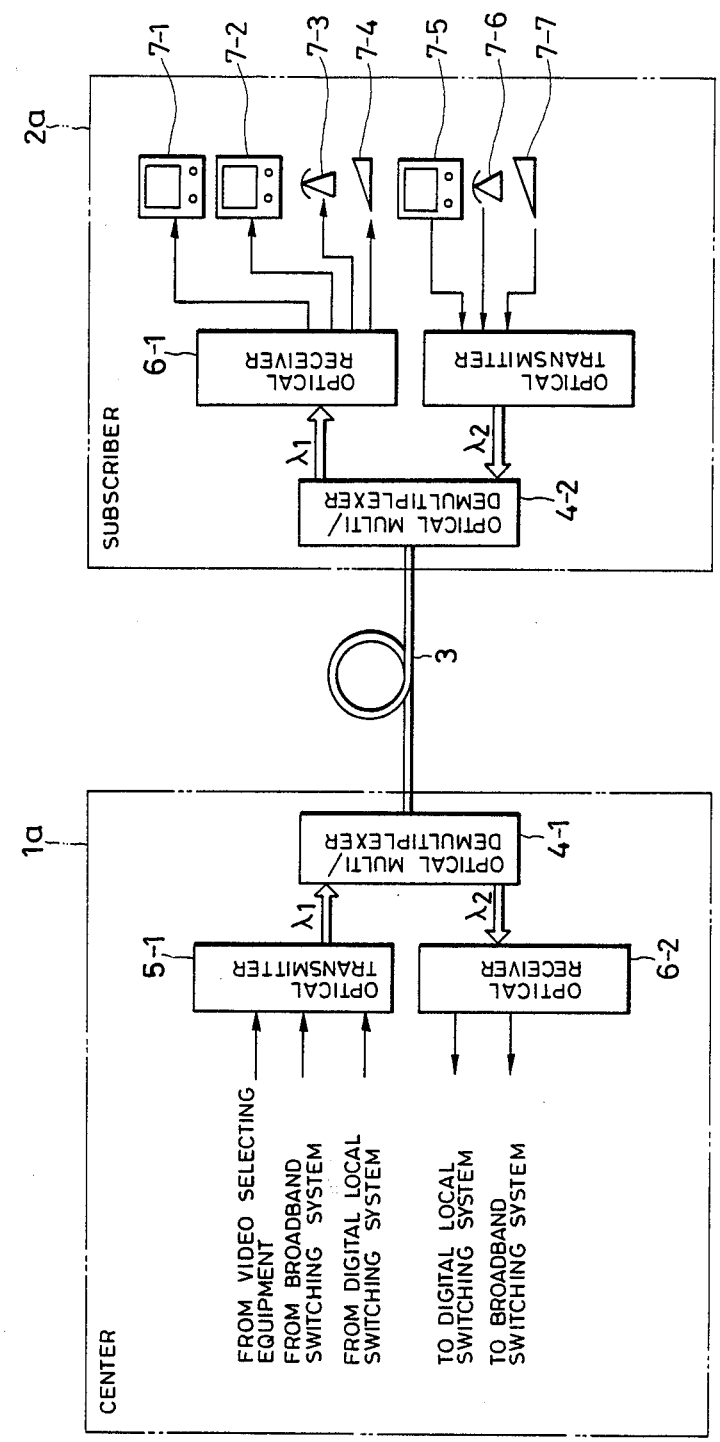
FIG. 6 is a functional block diagram of the conventional transmission system.
Figure 7:
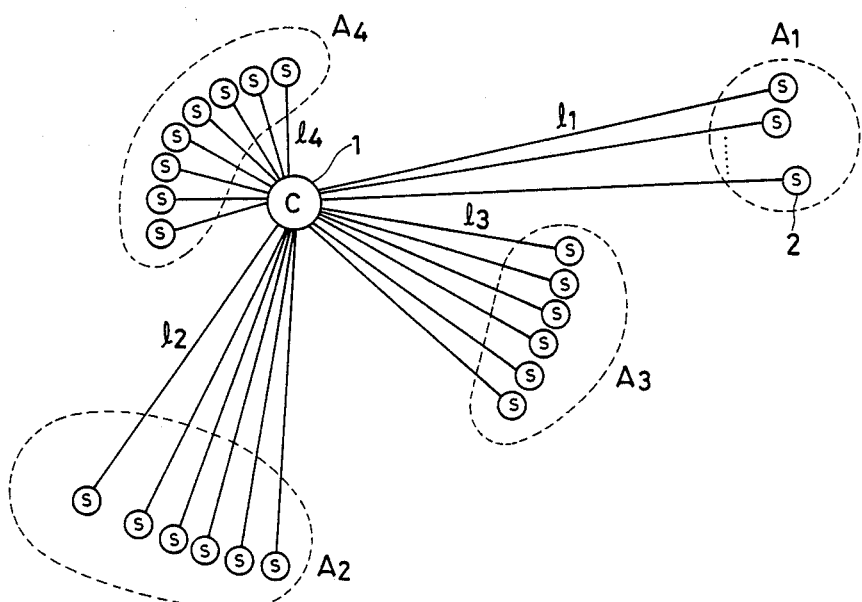
FIG. 7 is a network configuration diagram of the conventional two-way optical fiber transmission network.
Figure 8:
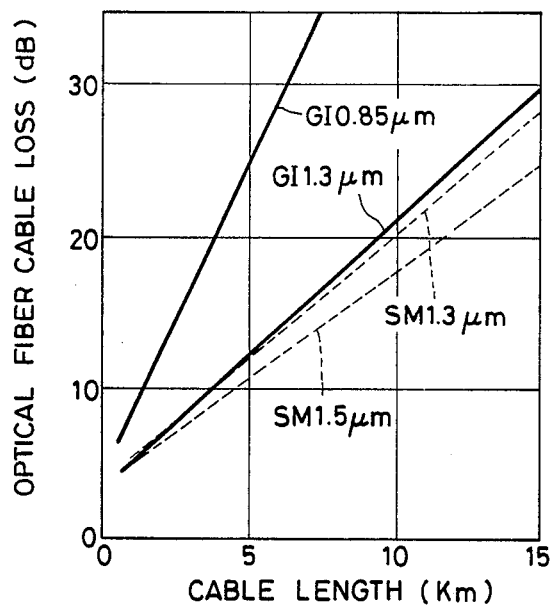
FIG. 8 is a graph showing the loss characteristics of the optical fiber cable.
Figure 9:
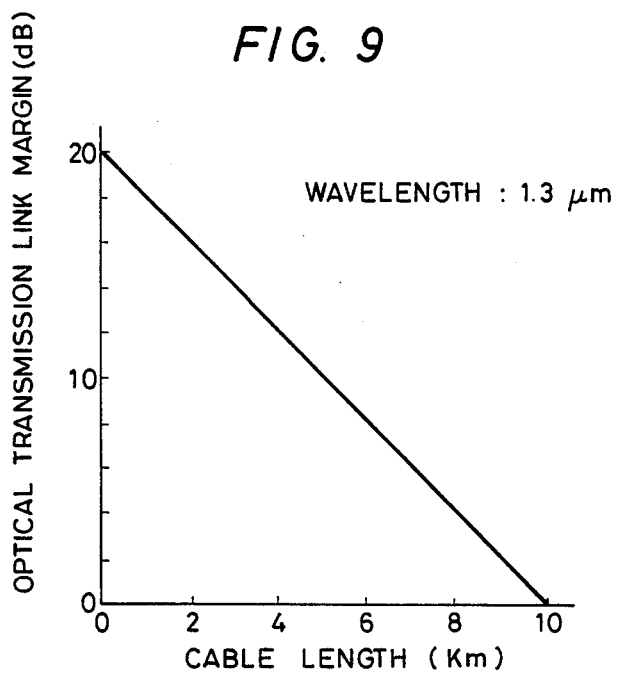
FIG. 9 is a graph showing the relation between the transmission distance and the optical transmission link margin with the transmission link margin assumed to be zero dB for the transmission distance of 10 km.

This invention is described in the following by taking preferred embodiments as examples and referring to the attached drawings. FIG. 1 shows a network configuration of one embodiment of the two-way optical fiber transmission network of this invention; FIG. 2 is a functional block diagram of the system at the center and subscriber used in the above embodiment; and FIG. 3 a network configuration of another embodiment of this invention.

In the embodiment of FIG. 1, subscriber areas A1, A2, A3, A4 are shown distributed around the center 10. In the area A1 with its transmission distance l1 from the center 10 to its subscribers 20 close to the maximum transmission distance of say 10 km, an optical fiber cable is laid to individual subscribers. In the areas A2, A3, A4 where the distance l2, l3, l4 from the center 10 to the subscribers is shorter than 10 km, optical star couplers 30 are installed in each area and are individually connected with the center 10 through optical fiber cables. As the transmission distance becomes shorter, the dividing number of the optical star coupler 30 increases.

FIG. 2 shows a functional block diagram of the system at the center and subscriber used in this invention. The center 10a has a one-to-one correspondence with a subscriber 20a and there are the same number of such centers 10a installed in the center 10 as that of the subscribers 20a. The subscriber equipment has a configuration as shown at 20a in the figure.

First, we explain the process of information transmission from the center 10a. Signals from the optical transmitter 5-1 is entered to the wavelength transducer 8-1 which selects, according to a selection signal from a subscriber 20a, chooses a desired wavelength from among many wavelengths $\lambda 1$ to $\lambda k$. The light signal of a selected wavelength is transferred to the optical multi/demultiplexer 4-1 and transmitted over the optical fiber cable 3 to the optical multi/demultiplexer 4-2 of the subscriber 20a. The wavelength selective switch 9-2 chooses the optical signal of a desired wavelength sent from the center 10a. The selected light signal is supplied to the optical receiver 6-1 where it is converted into electric signal before being fed to respective terminal devices 7-1 to 7-4 (television, telephone and facsimile).

The wavelength selective switches 9-1, 9-2 can be formed by a wavelength selective element capable of changing the selected wavelength. It may be "an optical resonator type wavelength selector using liquid crystal" introduced by M. Hashimoto and S. Aoyagi in the annual meeting of Electr. Comm. Soc. of Japan (1985), Paper 850, Digest, pp. 4–21. This wavelength selector with variable oscillating wavelength is obtained by forming a Fabry-Pérot resonator which has a wavelength selectivity and using a refraction rate varying substance (crystal) to make the oscillating wavelength variable by an applied control voltage. Thus, the use of the wavelength selective element in this invention makes it possible to select an optical signal of a desired wavelength from the center and enter it into the optical receiver.

Another method of forming the wavelength selective switches 9-1, 9-2 is the use of LD as introduced by K. Kikushima, Sano and Nagai in their paper titled "Tunable Amplification Properties of LD," Annual Mtg. of Electr. Comm. Soc. of Japan (1984), Paper 855, Digest, pp. 4–9. This method uses $C^3$-LD to selectively amplify an optical signal of a desired wavelength.

The wavelength transducer may be realized by the use of $C^3$-LD as introduced by W. T. Tsang, N. A. Olsson and R. A. Logan in their paper (Applied Physics Letter, 42(8), 15 April 1983, p 650–652). The use of this laser enables changing the oscillation wavelength in the range of 1.3 $\mu m \pm 75 \text{Å}$ in steps of 10Å/mA by regulating the injected control current.

Next, the process of transmitting information from the subscriber 20a is described. The signal from the optical transmitter 5-2 connected to the terminal equipment (television, telephone, facsimile) 7-5 to 7-7 is entered into the wavelength transducer 8-2. The wavelength transducer 8-2, according to a selection signal sent from other subscriber via the center 10a, selects a desired wavelength from among the wavelengths $\lambda k+1$ to λz and sends it through the optical multi/demultiplexer 4-2 and the optical fiber cable 3 to the optical multi/demultiplexer 4-1 of the center 10a. The center 10a picks up the light signal of the subscriber-specified wavelength by the wavelength selective switch 9-1 and transfers it to the optical receiver 6-2 where it is converted into electric signal. The electric signal is further supplied to a digital local switching system or a broadband switching system from which it is transmitted to the other subscriber. The functional block diagram of FIG. 2 is basically a two-wavelength bidirectional optical fiber transmission system, but it may contain three or more wavelengths.

Figure 3:
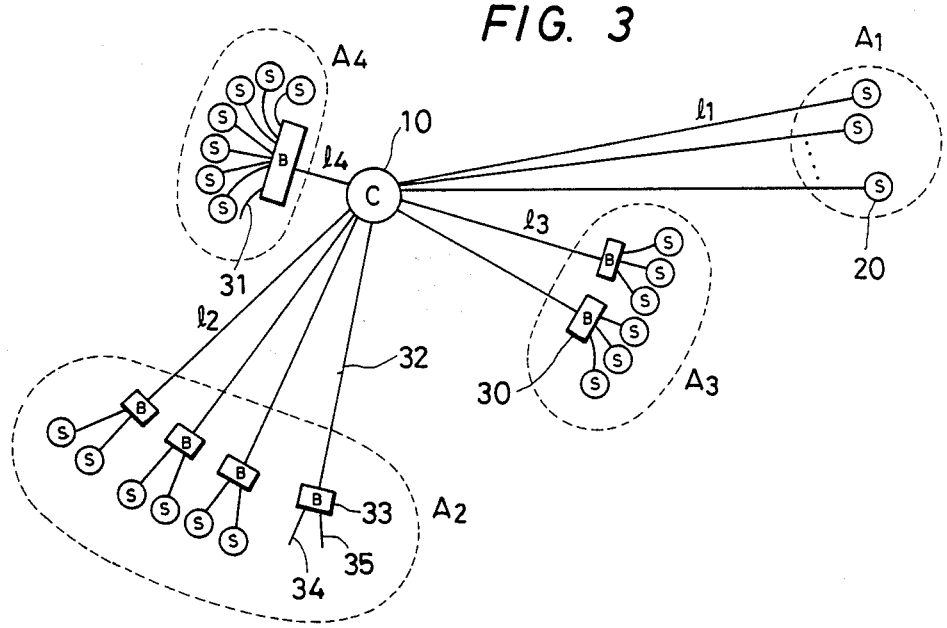
FIG. 3 is a network configuration of another embodiment of this invention.

FIG. 3 shows another embodiment of this invention. This embodiment in anticipation of an increase in the number of subscribers in the future provides a spare optical fiber cable 32, an optical star coupler 33, and branch ports 34, 35 in the area A2 and a spare branch port 31 in the area A4. In this way, installing spare facilities enables the system to cope with a future increase in the number of subscribers. While in FIG. 1 the optical star coupler used has a one-to-one correspondence between the optical star coupler output ports and the subscribers in which the coupler with N output ports is connected with the same number of subscribers, it is also possible to give one subscriber two or more output ports to use, thereby enhancing the information transmission service. This makes two or more signal channels available for a subscriber to choose at one time.

As described above, in the two-way optical fiber transmission network of this invention that connects the center and its subscribers scattered around the center through optical fiber cables for transmission of information signals, one or more optical fiber cables are laid to each of the areas that are within the maximum optical fiber transmission distance, and 1-input-to-N-output type optical star couplers—to each of which N subscribers are connected—are attached to the remote end of the optical fiber cables. This configuration enables a substantial reduction in the overall length of optical fiber cables laid in the system to below one several tenths of the cable length required by the conventional network and therefore achieves the corresponding reduction in cost.

Excess optical fiber cables can be used as spare communication channels to cope with an anticipated increase of subscribers in the future, thus providing the system with improved expandability and flexibility compared with the conventional system.

The invention has a further advantage that since the wavelength of light signal can arbitrarily be changed, i.e., the wavelength for information signal carried over the transmission line is not fixed, external interference or eavesdropping can be prevented.

I claim:

1. A two-way optical fiber transmission network comprising:
    a center that transmits and receives information;
    first and second areas each having a plurality of subscribers who are using information from the center;
    an optical star coupler connected with the plurality of subscribers in the first area;
    an optical fiber cable connecting the optical star coupler with the center; and
    optical fiber cables each connecting the plurality of subscribers in the second area with the center,
    wherein the distance between the center and the optical star coupler is shorter than the distance between the center and the subscriber closest to the center in the second area.

2. A two-way optical fiber transmission network as set forth in claim 1, in which the first area comprising:
    a spare optical star coupler with a plurality of branch ports; and
    an optical fiber cable connecting the spare optical star coupler with the center.

3. A two-way optical fiber transmission network as set forth in claim 1, in which the optical star coupler has a spare branch port.

4. A two-way optical fiber transmission network comprising:
    a center that transmits and receives information;
    a plurality of areas each having a plurality of subscribers who are using information from the center;
    one or more optical star couplers connected with a plurality of subscribers in one or more areas;
    one or more optical fiber cables connecting the one or more optical star couplers with the center; and
    optical fiber cables connecting the plurality of subscribers in the remaining areas with the center,
    wherein the distance between the center and the closest optical star coupler to the center is shorter than the distance between the center and the subscriber closest to the center in the remaining areas.

5. A two-way optical fiber transmission network as set forth in claim 4, in which the area having the optical star couplers comprises:
    a spare optical star coupler with a plurality of branch ports; and
    an optical fiber cable connecting the spare optical star coupler with the center.

6. A two-way optical fiber transmission network as set forth in claim 4, in which the optical star couplers have a spare branch port.

7. A two-way optical fiber transmission network comprising:
    a center for transmitting and receiving information;
    a plurality of optical star couplers each having a dividing number and being connected with a plurality of subscribers; and
    a plurality of optical fiber cables each having a length that connects the corresponding optical star couplers with the center, as the length of each of the optical fiber cables being shorter, the dividing number of the corresponding optical star couplers for that cable being larger.

8. A two-way optical fiber transmission network including:
    a center for transmitting and receiving information;
    a first optical star coupler connected with the center by a first optical fiber cable and having a plurality of output ports; and
    a second optical star coupler connected with the center by a second optical fiber cable and having a plurality of output ports;
    the length of the first optical fiber cable being shorter than that of second optical fiber cable, and the number of the output ports of the first optical star coupler being larger than that of the second optical star coupler.

9. A two-way optical fiber transmission network including:
    a center for transmitting and receiving information;

a first optical star coupler connected with the center by a first optical fiber cable, being connected with a plurality of subscribers; and a second optical star coupler connected with the center by a second optical fiber cable, being connected with a plurality of subscribers;

the length of the first optical fiber cable being shorter than that of the second optical fiber cable, and the number of the subscribers connected with the first optical star coupler being larger than that of the subscribers connected with the second optical star coupler.

10. A two-way optical fiber transmission network comprising:

a center for transmitting and receiving information;

a plurality of optical star couplers each having a dividing number and being connected with a plurality of subscribers; and a plurality of optical fiber cables each having a length that connects the corresponding optical star couplers with the center, the relationship between the lengths of the optical fiber cables and the number of couplers attached to a particular cable being such that as the length of a cable is shortened, the dividing number of the star coupler is increased.

* * * * *